United States Patent Office 3,537,883
Patented Nov. 3, 1970

3,537,883
FINISHED LEATHER SUBSTITUTE
Robert S. Shaw, Huntingdon Valley, and Bayard V. Tirrill, Warminster, Pa., assignors to Rohm and Haas Company, Philadelphia, Pa., a corporation of Delaware
No Drawing. Filed July 11, 1968, Ser. No. 743,967
Int. Cl. B32b 27/08; D06n 3/08
U.S. Cl. 117—76                          2 Claims

ABSTRACT OF THE DISCLOSURE

The present invention is concerned with a method and compositions for finishing, and especially for coating or prime-coating, of leather substitutes, especially those having a polyurethane or a mixture (or reaction product) of a vinyl resin and polyurethane in its exposed surface layer to be finished. The compositions applied as the basecoat on the substitute leather are aqueous in character and comprise (1) certain acid-containing vinyl addition polymers of acrylonitrile and certain acrylic esters and (2) a water-soluble aminoplast condensate.

NATURE OF THE LEATHER SUBSTITUTES TO BE COATED

Various methods are used in the making of leather substitutes. For example, natural or artificial fibers may be bonded together with suitable bonding agents of polymeric character, either of addition or condensation type or mixtures of both types of materials and then one or both faces of the bonded fibrous mass is coated with a viscous polymer-containing composition which fills the pores or interstitial spaces at their juncture with the exposed surface and provides a substantially continuous coating over the fibrous base substrate.

In another type of leather substitute, the main body thereof is formed of "an expanded" polymer mass, which may, if desired, be reinforced by various filler substances, especially of fibrous type, and the surface or surfaces thereof are coated as in the case of the first-mentioned embodiment involving a bonded fiber body or mass.

In other instances, the substitute leather may comprise a laminated structure in which one or more laminae may be of the bonded-fiber type or one or more laminae may be of expanded type. The laminae are adhered together and the laminar structure obtained is coated as in the first two embodiments mentioned.

In general, the coating referred to contains a polyurethane or a mixture (or chemically combined reaction product) of a vinyl polymer and a polyurethane. The coating also is of a type which provides microporous openings in the coated structure by colloidal precipitation from a solvent/non-solvent mixture from which the solvent evaporates first, or, after drying, either as a result of volatilization of an interspersed volatile component or by the extraction of a soluble finely-divided particulate component. Alternatively, the coated mass, after drying, may be perforated mechanically, as by needle-punching. These coated substitute leather materials are thus permeable to moisture vapor. In all cases, the substitute leather at this stage has an unattractive appearance and the present invention is concerned with the finishing of such articles to make them decorative and attractive. It should be noted that "leather substitute" includes the so-called "poromeric" sheet materials, which latter term has been coined to describe a "microporous and permeable coriaceous (leatherlike) sheet material comprising a urethane polymer reinforced with polyester."

Proposals have been made to finish such poromeric sheet materials by the application of vinyl addition polymers. In some instances, good properties have been obtained with such finishes, but such finishing compositions have frequently been limited in respect to the colors that can be applied since attempts to use these polymers with colors other than black generally incur severe losses in quality, especially in abrasion resistance.

The finishing of such leather substitutes must not only provide an attractive appearance to the surface thereof, but other qualities are also needed. The finish coatings must provide a protective skin on the article that is tough. It should be resistant to abrasion both in wet and dry conditions. It must maintain good flexibility at temperatures as low as −20° F. It should withstand at least 40,000 flexes with essentially no damage (as measured at room temperature on a Bally Flexometer) in wet condition as well as in dry condition. It must have a moisture vapor permeability of at least 2300 g./100 sq. m./hr. when disposed as a seal or diaphragm on a desiccator containing calcium chloride and placed in an atmosphere at 75° C. and 90% relative humidity.

For purposes of reference, descriptions of several tests are given herein as follows:

Dry abrasion resistance

The finished substrate, clamped over a ¾-inch diameter brass rod, is reciprocally abraded in a 12-inch path against No. 10 cotton duck, using a pressure of 2 pounds weight per inch of sample width. Travel direction is perpendicular to the long axis of the rod, and operating frequency is at 35 to 40 cycles per minute. These conditions are conveniently met through the use of a Gardner washability machine to propel a carrier with an enclosed floating weight, constructed to meet the given specifications, which will move the test sample over the cotton duck affixed to the stationary table of the machine.

Rating of damage is done after 400 cycles of operation, using an arbitrary scale in which zero represents no finish damage (glossing is permitted) and 8 represents extensive damage across the entire width of the strip.

Wet abrasion resistance

The test is run by the same procedure as the dry test, except that the sample to be tested, is soaked in water for a minimum of 30 minutes up to about an hour before the test, and blotted with cheesecloth to remove excess water. The test is run for 20 cycles only and rated as in the dry test method.

Dry flexibility

The Bally Flexometer, a standard commercial machine, is used. Ratings are made after 40,000 flexes, using a 20-power binocular microscope to aid the eyes in evaluating degree of cracking. Test results are expressed on a 0 to 5 scale, in which zero indicates no cracking, 5 indicates essentially complete cracking in all crease marks.

Wet flexibility

Run for 40,000 flexes in the Bally Flexometer after soaking in water for one hour. Ratings are on the same basis as the dry test.

Cold test

The sample is conditioned for 30 minutes at the temperature to be tested in a suitable cold box and a single sharp 180° bend by hand (using gloves to avoid heat transfer) is made with the finish side out while the sample is still in the cold box. The crease is examined by refolding to the 180° bend to open any cracks. A rating of no cracks at −20° F. is considered satisfactory.

Water vapor permeability

Water vapor transmission from a 75° C., 90% relative humidity atmosphere through a piece of finished substrate into a sealed cup containing calcium chloride is measured. The finished side of the material faces the desiccant, and the cup is inverted to insure contact of the calcium chloride with the finish. After conditioning two hours in the humidity cabinet, the cup is quickly weighed, returned to the cabinet, and reweighed three hours later. Weight gain is determined and water vapor permeability reported in gm./100 m.²/hr. An acceptable minimum value is 2300 gm./100 m.²/hr. The Thwing-Albert Vapometer may be used for this test.

In accordance with the present invention, it has been discovered that certain compositions containing an organic or an inorganic pigment give outstanding results and meet the requirements of moisture vapor, permeability, flexibility both wet and dry, and abrasion resistance both wet and dry set out hereinabove. The compositions of the present invention contain a binder comprising a water-soluble aminoplast and a copolymer of 2 to 12% of a monoethylenically unsaturated acid, 2 to 25% by weight of acrylonitrile and the balance, to make 90 to 100%, of monomers of a ($C_4$–$C_8$) alkyl or methacrylate. The copolymer may contain up to 10% by weight of a vinyl aromatic compound, such as styrene or vinyl toluene, or of a ($C_1$–$C_3$) alkyl methacrylate, or 10% of a mixture of such an alkyl methacrylate with a vinyl aromatic hydrocarbon.

The acid employed may be acrylic acid, methacrylic acid, itaconic acid, methacryloxpropionic acid, acryloxyacetic acid, fumaric acid, maleic acid, crotonic acid, the half esters of an unsaturated dicarboxylic acid such as a ($C_1$–$C_4$) alkyl acid maleate, a ($C_1$–$C_4$) alkyl acid itaconate. Of the various acids, a preferred acid is acrylic acid.

The ($C_4$–$C_8$) alkyl acrylate or methacrylate may be n-butyl arcylate or methacrylate, isobutyl acrylate or methacrylate, 2-ethyl hexyl acrylate or methacrylate or other acrylic acid or methacrylic acid esters of a $C_4$–$C_8$ alkanol.

Besides the acid containing polymer, the binder contains also a water-soluble aminoplast such as a condensate of formaldehyde with urea or an aminotriazine such as melamine or benzoguanamine. The urea formaldehyde condensate may be simply dimethyl urea or dimethoxy methyl urea and the aminotriazine formaldehyde condensate may contain from 2 to 6 methylol groups per molecule of the aminotriazine. Preferably in the case of melamine formaldehyde the melamine contains 4 to 6 methylol groups and optionally from 2 to 6 of these methylol groups may be alkylated with methanol.

The polymers may be prepared by conventional polymerization procedures and they are intended to be used in making the coating compositions without recovery or separation of the polymer from the aqueous media. The aminoplast should be water-soluble and it may be mixed with the polymer dispersion either in the form of a water-soluble solid or as a suitably dilute or concentrated aqueous solution or aqueous-methanol solution of the aminoplast.

The amount of aminoplast employed in the composition is from 2 to 20% by weight based on the weight of the polymer (solids on solids) and is preferably 5 to 8% by weight of the polymer.

Such mixtures are in the pH range of 4.0 to 6.0 and surprisingly have excellent stability. In this important respect these blends containing acid functionality are superior to similar well-known blends containing amide functional polymers with aminoplasts, which are notoriously sensitive to pH and subject to stability problems. The amide functional polymer blends require careful pH adjustment on the alkaline side; an acidic pH leads to gelation by promoting self-crosslinking of the aminoplast resin, while a too highly alkaline pH inhibits the desired crosslinking, and usually causes some hydrolysis on the polymer chain. In any case, there is considerable pH drift with age of such a system using amide functionality. The acid functional system of the present invention does not change perceptibly in pH or viscosity after 200 hours at 140° F., and retains its crosslinking ability after such aging.

The amount of pigment in the coating compositions is such as to provide from 10 to 30% pigment volume concentration (PVC) and is preferably from 10 to 15% PVC with organic pigments and 15 to 30% PVC when inorganic pigments are used. The pigmented composition may be supplied with wetting or dispersing agents if the emulsifier present in the polymer dispersion is inadequate to properly disperse the amount of pigment employed or if it is desired to improve the wetting action of the coating composition on the leather substitute surface. The solids concentration of the aqueous coating composition including binder, pigment, and surface-active agents may range from 10 to 30% by weight at the time of application and preferably from 15 to 25% by weight.

In the finishing of the leather substitute one or more coats of the aqueous composition just defined may be applied with drying between the applications and at the conclusion thereof. The total dry weight of the coating composition applied should be in the range from 0.15 to 0.9 oz. per sq. yd. whether the composition is applied in one or a plurality of steps. Frequently, the application of three coats is preferred and it is preferred that the total dry deposit of this coating composition should be from 0.35 to 0.55 oz. per sq. yd.

In general, each of these coating compositions are pigmented although for special effects, it may be desired to avoid pigment in one or more coats when a plurality of coats are applied. Each of the coats is dried at room temperature or higher. If elevated temperatures are used, they may range as high as 200° to 400° F. and the time employed may be from 10 seconds at the higher temperatures mentioned to a matter of 3 to 15 minutes when the lower temperature mentioned is used.

After one or more of the coats of the aqueous composition have been applied to the substitute leather, it receives a final coating with a lacquer which may be clear or pigmented but is preferably clear. This lacquer is preferably applied in the range to provide a dry weight of deposit from 0.03 to 0.07 oz. per sq. yd. Generally, a thin coat obtained in a single coating operation is adequate though two or more coats may be applied if desired. The lacquer coat is followed by a short air drying for example from 10 seconds to one minute or the drying may be effected at temperatures elevated up to 300° F., a shorter time being required in that case.

The lacquer may be based on a cellulose ester such as cellulose acetate butyrate, cellulose acetate propionate or it may be a polyester or a vinyl polymer such as a copolymer of ethyl acrylate and methyl methacrylate. Plasticizers may be employed in this lacquer to provide the desired flexibility.

The substitute leather finished with the aqueous coating compositions with or without a topcoating of a lacquer may be embossed with smooth, sand-blasted, or patterned platens or rolls. This embossing may be effected under low pressure from 8 to 25 pounds per sq. in. at a temperature of about 225° to 350° F. over a time period of 10 seconds to 2 minutes. This embossing may be effected after application of the clear lacquer or it may be effected after the application of one or more of the aqueous coating compositions whether or not a lacquer is to be subsequently applied.

To assist those skilled in the art to practice the present invention, the following modes of operation are suggested by way of illustration, parts and percentages being by weight and the temperature in ° C. unless otherwise specifically noted.

(1)(a) An aqueous dispersion containing 40% of a polymer (A) consisting of 75 parts butyl acrylate, 15 parts acrylonitrile, and 10 parts of acrylic acid is prepared by conventional emulsion polymerization techniques.

(b) To a portion of this dispersion is added slowly with agitation a 10% aqueous solution of an aminoplast resin consisting of a melamine/formaldehyde/methanol condensate (B) (having about 5½ methylol units per melamine molecule and about 3 mols of methanol combined in the molecule) as follows:

|  | Parts by weight |
|---|---|
| Polymer dispersion (A) (40% solids) | 83.3 |
| Aminoplast Solution (B) (10% solids) | 16.7 |

This gives a 35% solids blend at pH 4.5 to 5.0.

(c) The 40% polymer (A) dispersion of part (a) is diluted to 35% concentration. Then it and the 35% polymer (A) aminoplast (B) blend are formulated into coating compositions by mixing each of them with an aqueous pigment dispersion, with or without such auxiliary materials as defoamers and levelling agents. In addition, an acid catalyst for the aminoplast is included in the blend containing the aminoplast. For example, there may be used an aqueous dispersion containing 14% channel black, 4% sulfated castor oil, and 5.8% casein.

A representative formulation is:

|  | Parts by weight |
|---|---|
| Polymer (A) dispersion (35%) | 50 |
| Pigment dispersion (24%) | 32 |
| Leveller (tributoxyethyl phosphate 17% and dispersing agents 2%) | 2.0 |
| Water to make a total of 100. |  |

When the polymer/aminoplast blend is formulated, the 35% blend replaces the 35% polymer dispersion and 1.8 parts of 10% NH$_4$Cl in water is added as a catalyst.

These coating formulations are applied to separate pieces of a poromeric sheet material as described in Example 1 of U.S. Pat. 3,000,757. The application is by air-spraying to deposit 0.4 ounce (dry weight) of the coating per square yard. They are then dried 5 minutes at 400° F.

(d) A clear topcoating of a solvent lacquer containing 5% cellulose acetate butyrate (17% butyryl, 1% hydroxyl, 15 seconds viscosity) and 7.5% dibutoxyethyl phthalate is applied by air-spraying to deposit 0.04 ounce/sq. yard (dry solids). The coating is dried 1 minute at 300° F.

(e) The finished poromeric sheets are embossed at 20 pounds per square inch at 320° F., using 1 minute dwell time.

(f) The finished sheets show the following properties:

| Binder in coating | Abrasion resistance | | Bally flex | | Cold test passed, ° F. | Water vapor permeability, gm./100 m.²/hr. |
|---|---|---|---|---|---|---|
|  | Dry | Wet | Dry | Wet |  |  |
| Blend polymer (A)/ aminoplast (B) | 0 | 0 | 0 | 0 | −25 | 3,570 |
| Polymer (A) above | 0 | 1 | 0 | 0 | −25 | 3,940 |

(2) The process of (1) is repeated except that in part (c) thereof, there is used in the formulations, 32 parts by weight of an aqeous pigment dispersion (25% solids) containing 6% of rutile titanium dioxide and 23% of iron oxides. The finished sheets show the following properties:

| Binder in coating | Abrasion resistance | | Bally flex | | Cold test passed, ° F. | Water vapor permeability, gm./100 m.²/hr. |
|---|---|---|---|---|---|---|
|  | Dry | Wet | Dry | Wet |  |  |
| Blend polymer (A)/ aminoplast (B) | 0 | 0 | 0 | 0 | −25 | 3,370 |
| Polymer (A) above | 3-4 | 2-4 | 0 | 0 | −25 | 3,020 |

(3) The process of (1) is repeated except that in part (c) thereof, there is used in the formulations, 15 parts by weight of an aqueous pigment dispersion (54% solids) containing 50% titanium dioxide. The sheets show the following properties:

| Binder in coating | Abrasion resistance | | Bally flex | | Cold test passed, ° F. | Water vapor permeability, gm./100 m.²/hr. |
|---|---|---|---|---|---|---|
|  | Dry | Wet | Dry | Wet |  |  |
| Blend polymer (A)/ aminoplast (B) | 1 | 1 | 0 | 0 | −25 | 2,980 |
| Polymer (A) above | 2-3 (175) | 7 (14) | 0 | 0-1 | −25 | 2,840 |

Figures in parentheses denote early termination of test to avoid excessive damage. Normal runs are 400 cycles dry, 20 cycles wet, whereas the table shows 175 cycles dry and 14 cycles wet.

(4) The process of (1) is repeated except that in part (c) thereof, there is used in the formulations, 32 parts by weight of an aqueous pigment dispersion (45% solids) containing 40% of iron oxide. The sheets show the following properties:

| Binder in coating | Abrasion resistance | | Bally flex | | Cold test passed, ° F. | Water vapor permeability, gm./100 m.²/hr. |
|---|---|---|---|---|---|---|
|  | Dry | Wet | Dry | Wet |  |  |
| Blend polymer (A)/ aminoplast (B) | 0 | 0-1 | 0 | 1 | −25 | 3,990 |
| Polymer (A) above | 4-5 (250) | 4 | 0 | 1 | −25 | 3,660 |

Figures in parentheses denote early termination of test to avoid excessive damage. Normal runs are 400 cycles dry, 20 cycles wet.

(5) The process of each of (1), (2), (3), and (4) is repeated except that the blend of polymer (A) and aminoplast (B) is as follows:

|  | Parts by weight |
|---|---|
| Polymer (A) dispersion (40% solids) | 60 |
| Aminoplast (B) solution (10% solids) | 40 |

Similar results in abrasion resistance and the other properties are obtained as in the preceding procedures.

(6) Procedure (1) above is repeated except that the polymer dispersion (A) is replaced with a 40% solids dispersion of an emulsion copolymer of 73% butyl acrylate, 12% butyl methacrylate, 13% acrylonitrile, and 2% methacrylate acid. The finished poromeric sheet material has properties which are comparable to those obtained in Procedure (1).

(7) Procedure (1) above is repeated except that the polymer dispersion (A) is replaced with a 40% solids dispersion of an emulsion copolymer of 75% butyl acrylate, 10% vinyltoluene, 7% acrylonitrile, and 8% acrylic acid. The finished poromeric sheet material has properties which are comparable to those obtained in Procedure (1).

(8) Procedure (1) above is repeated except that the polymer dispersion (A) is replaced with a 40% solids dispersion of an emulsion copolymer of 75% butyl acrylate, 10% vinyltoluene, 7% acrylonitrile, and 8% acrylic acid and replacing the aminoplast (B) with a 10% aqueous solution of dimethoxymethyl urea. The finished poromeric sheet material has properties which are comparable to those obtained in Procedure (1).

(9) Procedure (1) above is repeated except that the polymer dispersion (A) is replaced with a 40% solids dispersion of an emulsion copolymer of 65% 2-ethylhexyl acrylate, 25% acrylonitrile, and 10% acrylic acid and the aminoplast (A) is replaced by a 10% aqueous solution of dimethylolurea. The finished poromeric sheet material has properties which are comparable to those obtained in Procedure (1).

(10) Procedure (1) above is repeated except that the polymer dispersion (A) is replaced with a 40% solids dispersion of an emulsion copolymer of 80% butyl acrylate, 15% acrylonitrile, and 5% methacryloxypropionic acid and replacing the aminoplast (A) with a melamine formaldehyde condensate containing about 4 methylol groups per melamine molecule of which an average of about 2 are methylated. The finished poromeric sheet material has properties which are comparable to those obtained in Procedure (1).

(11) Procedure (1) is repeated except that the aminoplast (A) is a 10% aqueous solution of hexamethoxymethyl melamine. The finished poromeric sheet material has properties which are comparable to those obtained in Procedure (1).

We claim:
1. A leather substitute having its main or base substrate providing in its outermost surface a polyurethane or a mixture of a vinyl addition polymer and a polyurethane, and having adhered to such surface one or more layers of a pigment/polymer/aminoplast composition, the pigment being in a pigment volume concentration of 10 to 30%, the polymer of which is a copolymer of monoethylenically unsaturated molecules comprising 2 to 12% by weight of a monoethylenically unsaturated acid, 2 to 25% by weight of acrylonitrile, 0 to 10% by weight of a vinyl aromatic compound or a ($C_1$–$C_3$) alkyl methacrylate or of a mixture of a vinyl aromatic compound and such a methacrylate and the balance to make 100% of a ($C_4$–$C_8$) alkyl acrylate or methacrylate, the aminoplast being a water-soluble condensate of formaldehyde with urea or an aminotriazine, or a methylated derivative of such a condensate, and the amount of aminoplast being 2 to 20% of the weight of the polymer, and a topcoat of a clear or pigmented lacquer film superimposed on said layer.

2. A finished, abrasion-resistant leather substitute according to claim 1 having good flexibility at temperatures as low as —20° F., which is capable of withstanding 40,000 flexes in wet and in dry condition, and which has a moisture vapor permeability of at least 2300 g./100 sq. m./hr.

References Cited
UNITED STATES PATENTS

| | | | |
|---|---|---|---|
| 3,000,757 | 9/1961 | Johnson et al. | 117—63 |
| 3,238,167 | 3/1966 | Wolff et al. | |
| 3,257,261 | 6/1966 | Hochberg | 161—190 X |
| 3,455,727 | 7/1969 | Dye. | |

WILLIAM D. MARTIN, Primary Examiner

R. HUSACK, Assistant Examiner

U.S. Cl. X.R.

117—11, 135.5, 161; 161—190

UNITED STATES PATENT OFFICE
CERTIFICATE OF CORRECTION

Patent No. 3,537,883     Dated November 3, 1970

Inventor(s) Robert S. Shaw and Bayard V. Tirrill

It is certified that error appears in the above-identified patent and that said Letters Patent are hereby corrected as shown below:

Column 6, line 12 "2-0" should be --2-3--.

Column 6, line 61 "methacrylate" should be --methacrylic--.

Signed and sealed this 27th day of May 1975.

(SEAL)
Attest:

RUTH C. MASON
Attesting Officer

C. MARSHALL DANN
Commissioner of Patents
and Trademarks